United States Patent

Shimano et al.

[11] Patent Number: 5,930,220
[45] Date of Patent: Jul. 27, 1999

[54] TRACKING METHOD FOR OPTICAL DISK APPARATUS USING DIFFRACTION LIGHT

[75] Inventors: Takeshi Shimano, Tokorozawa; Akira Arimoto, Kadaira; Takeshi Nakao, Sagamihara; Masayuki Inoue, Yokohama; Kunikazu Ohnishi, Yokosuka; Yoshio Suzuki, Yokohama, all of Japan

[73] Assignee: Hitachi, Ltd., Tokyo, Japan

[21] Appl. No.: 08/770,075

[22] Filed: Dec. 19, 1996

[30] Foreign Application Priority Data

Dec. 21, 1995 [JP] Japan ................................. 7-333203

[51] Int. Cl.$^6$ ........................................................ G11B 7/00
[52] U.S. Cl. ........................ 369/110; 369/44.23; 369/109; 369/112
[58] Field of Search ................................. 369/112, 110, 369/109, 103, 44.12, 44.23, 58

[56] References Cited

U.S. PATENT DOCUMENTS

| | | | |
|---|---|---|---|
| 5,235,581 | 8/1993 | Miyagawa et al. | 369/44.12 |
| 5,361,244 | 11/1994 | Nakamura et al. | 369/44.23 |
| 5,446,565 | 8/1995 | Komma et al. | 369/44.23 |
| 5,481,386 | 1/1996 | Shimano et al. | 369/109 |
| 5,600,614 | 2/1997 | Katayama et al. | 369/44.23 |
| 5,633,852 | 5/1997 | Maruyama et al. | 369/44.23 |
| 5,648,951 | 7/1997 | Kato et al. | 369/109 |
| 5,659,533 | 8/1997 | Chen et al. | 369/109 |
| 5,673,247 | 9/1997 | Sekimoto et al. | 369/110 |
| 5,687,153 | 11/1997 | Komma et al. | 369/110 |

OTHER PUBLICATIONS

National Technical Report, vol. 40, No. 6 (1994), pp. 771–778.

*Primary Examiner*—Nabil Hindi
*Attorney, Agent, or Firm*—Kenyon & Kenyon

[57] ABSTRACT

In an optical head, light from a semiconductor laser is directed through a condensing optical system with a condensing lens onto an optical information recording medium through a transparent substrate in the form of a light spot. A unit for producing a light spot position control signal and a unit able to move the light spot, which supports the objective lens for movement, position the light spot on an information track. Light reflected from the optical information recording medium is directed through a polarized light branching element to a photo detector. Also mounted for movement with the objective lens are a polarization conversion element, arranged between the optical information recording medium and the polarized light branching element in order to change the polarization state of light incident to the optical information recording medium and reflected therefrom and a polarization diffraction grating, the diffraction efficiency of which changes depending on the change in the polarization state of the incident light and the reflected light caused by the polarization conversion element. The light spot control signal is detected from both reflected light diffracted through the polarization diffraction grating and non-diffracted reflected light contained in the light which passes through the polarized light branching element.

4 Claims, 7 Drawing Sheets

TRACKING METHOD FOR OPTICAL DISK APPARATUS USING DIFFRACTION LIGHT

BACKGROUND OF THE INVENTION

The present invention relates in general to a an optical head for reproducing a record in an optical information recording medium, and more particularly to a technology for promoting high accuracy of tracking control of the optical head.

In order to position a condensed light spot on an information track on an optical information recording medium such as an optical disk, the focal point control is carried out in a direction perpendicular to a surface of the optical disk, while the tracking control is carried out in a direction within the surface of the optical disk. As for a method of detecting a control signal for the tracking control, some methods have been proposed. The method which is currently most widely used is a method called the push-pull method. This method is such that when a light spot which has been condensed on the disk is diffracted through the periodical guiding grooves or information pit tracks formed on the disk and both its zero-order light and its ± first order diffracted light are diffracted on the pupil surface of an objective lens, if the light spot is deviated from the position on the guiding grooves or between the grooves, or the position on the information pit track, since the phase of the + first order diffracted light is shifted in the direction opposite to that of the − first order diffracted light, it is detected that there arises a unbalance between the light intensity which is obtained as a result of interference between the + first order diffracted light and the zero-order light free from the phase shift and the light intensity which is obtained as a result of the interference between the − first order diffracted light and the zero-order light free from the phase shift.

These two interference intensities are detected by two division photo detector independently of each other, and a differential output therebetween is obtained in order to make it a tracking error signal. The tracking error signal is multiplied by a suitable gain and then is fed back to means for being able to move the light spot within the disk surface, such as a two-dimensional actuator or a galvanomirror each having an objective lens mounted thereon so as to form a closed loop, whereby it is possible to position the light spot on the track at all times.

Now, in the method wherein the galvanomirror which serves to move the light spot by changing an inclination of the light made incident to the objective lens is employed as the means for being able to move the light spot, the aberration may readily occur by inclining the light. For this reason, currently, there is in general employed the two-dimensional actuator which serves to move the objective lens. In this case, since the objective lens is moved so as to follow the track, thereby moving the light spot, the light spot on the two division photo detector is also moved in correspondence to a movement amount of the objective lens from an optical axis so that an offset occurs in the tracking error signal. Therefore, if the movement amount is too large, the offset can not be disregarded. As a result, there are caused reduction of an amplitude of the reproduced signal and increase of the cross talk between the adjacent tracks, and hence the signal-to-noise ratio of the reproduced signal is degraded.

The prior art for solving the above-mentioned problem is, for example, described in an article of NATIONAL TECHNICAL REPORT, Vol. 40, No. 6 (1994), pp. 771 to 778. In this technology, an objective lens, a λ/4 plate and a polarizing type diffraction grating are integrated in order to be mounted to a two-dimensional actuator. Then, the polarizing type diffraction grating is designed in such a way that the interference area between the + first order diffracted light of the diffracted light caused by the disk and the zero-order light, and the interference area between the − first order diffracted light of the diffracted light caused by the disk and the zero-order light are respectively diffracted at different angles of diffraction. If such a structure is adopted, the interference area between the + first order diffracted light and the zero-order light and the interference area between the − first order diffracted light and the zero-order light can be separated from each other on the detector. Therefore, if the two division photo detector is designed in such a way that even if the objective lens is moved, those light beams are not deviated from any position on the detector, it is possible to cancel the offset which is caused by movement of the light spot on the detector.

In addition, since the diffraction grating is made have the polarizing characteristics, it is made possible that the diffraction efficiency is made approximate zero when the light which is being directed to the disk permeates through the diffraction grating, while the suitable diffraction efficiency is obtained when the light reflected from the disk permeates through the diffraction grating again. If the diffraction grating of interest is the normal diffraction grating which has no polarizing characteristics, since the light which is being directed to the disk is also diffracted, the loss in the quantity of light can not be avoided. However, by making the diffraction grating of interest the polarizing type diffraction grating in such a way, only the diffraction of the necessary reflected light can be caused and hence the loss in the quality of light can be prevented.

However, in the above-mentioned prior art example, since the zero-order light which is not diffracted through the polarizing type diffraction grating is directly returned back to a semiconductor laser, only the diffracted light can be received. In this case, however, the separation of the interference area between the + first order diffracted light caused by the disk and the zero-order light from the interference area between the − first order diffracted light caused by the disk and the zero-order light becomes inconvenient when detecting a focal point deviation signal. Heretofore, the methods which have been widely used as the focal point deviation method in the optical disk head are the astigmatism method and the beam size detecting method. The former is such that the astigmatism is generated in the detected beam of light using a cylindrical lens or the like, and a four division detector is arranged in the minimum circle of confusion when the focusing state is obtained on the disk, and the differential output between the sum signal of the detector outputs in one diagonal direction thereof and the sum signal of the detector outputs in the other diagonal direction thereof is obtained. The latter is such that the differential output between the sum signals of the outputs of the two two-division photo detectors which are arranged before and after the focal point position is obtained. In this connection, in both the methods, the division directions of the division detector are determined in such a way that the disturbance which is caused when the light spot travels across the track on the disk does not get mixed with the focal point deviation signal. In such focal point deviation detection, since the detection of the intensity distribution of the light spot resulting from the focal point deviation, it is inconvenient that the light which is made incident to the detection system through the polarizing type diffraction grating is separated from the beginning.

In the above-mentioned prior art example, in order to solve that problem, the polarizing type diffraction grating is divided into a tracking signal detection area and a focal point deviation signal detection area so that the two areas correspond to the different diffraction directions, respectively. In this case, however, since the polarizing type diffraction grating becomes complicated, the manufacturing cost thereof is necessarily increased. In addition, there arises a problem that since the zero-order light is directly returned back to the semiconductor laser, the laser noises are generated and hence the reduction of quality of the reproduced signal is brought on. In addition, in recent years, the optical disks having different substrate thicknesses have been developed and are planned to come onto the market. However, the above-mentioned prior art does not make mention of interchange of such optical disks having different substrate thicknesses at all.

SUMMARY OF THE INVENTION

In the light of the foregoing problems associated with the prior art, it is therefore an object of the present invention to provide means for reducing an offset of a tracking signal which is inexpensive and has less return optical noise and which is capable of readily carrying out detection of the focal point deviation signal and of being applied to optical disks having different substrate thicknesses.

In order to solve the above-mentioned problems, an optical head includes: a semiconductor laser; a light condensing optical system constituted by at least an objective lens for condensing a light beam emitted from the semiconductor laser on an optical information recording medium mounted on a transparent substrate through the substrate; means for producing a light spot position control signal and means for being able to move a light spot which serve to position a light spot which has been condensed on the optical information recording medium on an information track on the optical information recording medium; a polarized light branching element for branching reflected light from the optical information recording medium from the light condensing optical system; a polarization conversion element arranged between the light information recording medium and the polarized light branching element for changing a polarization state of the incident light and the reflected light; a polarizing type diffraction grating the diffraction efficiency of which is changed depending on the change, in the polarization state of the incident light and the reflected light, which is caused by the polarization conversion element; and a photo detector for receiving the reflected light from the polarized light branching element in order to subject the reflected light thus received to the photoelectric conversion. In this connection, the objective lens, the polarization conversion element and the polarizing type diffraction grating are moved together with one another, thereby moving the light spot on the optical disk.

In addition, the light spot control signal is detected from both the diffracted light through the polarizing type diffraction grating and the non-diffracted light out of the light which has been obtained by branching the reflected light through the polarized light branching element.

In addition, as another method, a plurality of objective lenses which are approximately aplanatic in a plurality kinds of transparent substrates having different thicknesses are mounted as the objective lens to the optical head. In this connection, the objective lenses are mounted integrally with both the polarization conversion element and the polarizing type diffraction grating, or with the polarization conversion element to the means for being able to move a light spot, respectively. Also, means is additionally provided which serves to select one of the plurality of objective lenses in order to insert it into the optical path in correspondence to the optical information recording medium from which information is reproduced.

Further, as still another method, an objective lens with which the optimal thicknesses of the substrate for condensing the laser beam through its central portion and its peripheral portion independently without aberration are different from one another is mounted as the objective lens to the optical head.

Furthermore, as yet another method, a grating is added to the objective lens so that the optimal thicknesses of the substrate for condensing the zero-order light and the first order light obtained through the grating without aberration, respectively, are different from one another.

DESCRIPTION OF THE PREFERRED EMBODIMENTS

The preferred embodiments of the present invention will hereinafter be described in detail with reference to the accompanying drawings.

Figure 1:
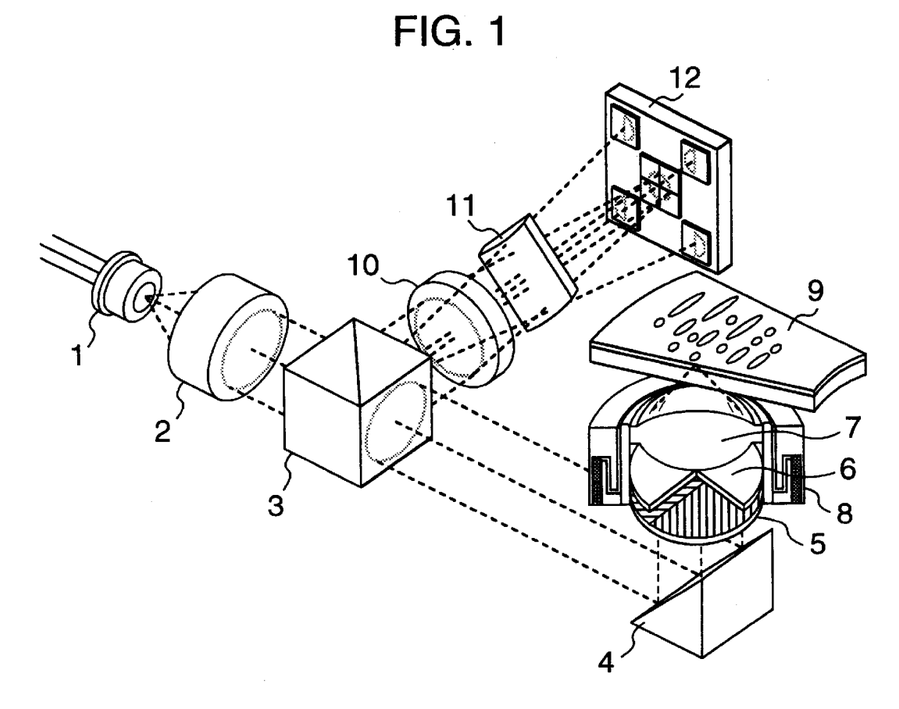
FIG. 1 is a perspective view showing a basic embodiment according to the present invention.

Referring first to FIG. 1, there is shown a basic embodiment of the present invention. A light beam emitted from a semiconductor laser 1 is made parallel light through a collimator lens 2 and permeates through a polarization beam splitter 3 and is reflected by a mirror 4 for directing the light upwardly, and then is made incident to a polarizing type diffraction grating 5. At this time, the incident polarized light is the P polarized light with respect to the polarization beam splitter 3 and hence has a direction parallel to the central division line of the polarizing type diffraction grating 5. In this connection, both the direction of the principal axis and the depth of unevenness of the polarizing type diffraction grating 5 are designed in such a way that the phase difference between the recess portion and the convex portion of the grating become integral multiples of the wavelength $\lambda$, and hence no diffracted light is generated. The light which has permeated through the polarizing type diffraction grating 5 is converted into the circularly polarized light through a $\lambda/4$ plate 6 and is made incident to an objective lens 7 and then is condensed on an optical disk 9. At the time when the reflected light permeates through the objective lens 7 again and then permeates through the $\lambda/4$ plate 6 again, it is converted into the linearly polarized light in a direction perpendicular to that in the incident time. Since when that linearly polarized light permeates through the polarizing type grating 5 again, its phase difference is set so as to realize the predetermined diffraction efficiency, that linearly polarized light is diffracted in a direction in which the areas on the both sides with respect to the central division line of the polarizing type diffraction grating 5 make an angle of 45 degrees with the central division line, respectively. At this time, the diffraction efficiency is designed so that the zero-order light remains. Thereafter, the light is reflected from the mirror 4 and then is reflected from the polarization beam splitter 3 and is directed to a condenser lens 10 and a cylindrical lens 11 for generating the astigmatism in order to detect the focal point deviation, and then is condensed on a photo detector 12. The photo detector 12 has four-divided photo detection areas in which the central portions thereof are adjacent to one another, and four photo detection areas which are arranged in the periphery of the four-divided photo detection areas. The four division photo detector at the central position receives the zero-order light from the polarizing type diffraction grating 5, while the peripheral photo detectors receive the ± first order diffracted light. In this connection, the differential output between the sum signal of the outputs of the two detector elements of the four division photo detector at the central position which are arranged along one diagonal direction and the sum signal of the outputs of the two detector elements thereof which are arranged along the other diagonal direction is obtained, thereby obtaining a focal point deviation error signal in the astigmatism method. In addition, with respect to the peripheral four photo detectors as well, the differential output between the sum signal of the outputs of the two photo detectors which are arranged along one diagonal direction and the sum signal of the outputs of the two detectors which are arranged along the other diagonal direction is obtained, thereby obtaining a tracking error signal by the push-pull method. While there is no reason of limiting particularly the photo detectors in order to obtain the data signal, for example, the sum signal which is obtained from the four division photo detector at the central position may be available. But, since if the extremely many signals are calculated, then there is a possibility that the shot noise of the detector and the amplifier noise of an amplifier provided in the middle of the circuit are increased, the number of signals subjected to the calculation may be limited to a suitable number in some cases. In addition, while if the level of the noises of the medium and the light source is sufficiently low, then there is a possibility that the shot noise and the amplifier noise are predominant, in the case where the noise needs to be reduced for all that along with promotion of the high density, it is better that the addition is not carried out at all. In this case, either one of the four division photo detector elements is selected, or another beam splitter is inserted between the polarization beam splitter and the condenser lens 10. Then, the detection output which is obtained by condensing the resultant light on one detector element through the condenser lens may be made a reproduced signal.

Figure 2:
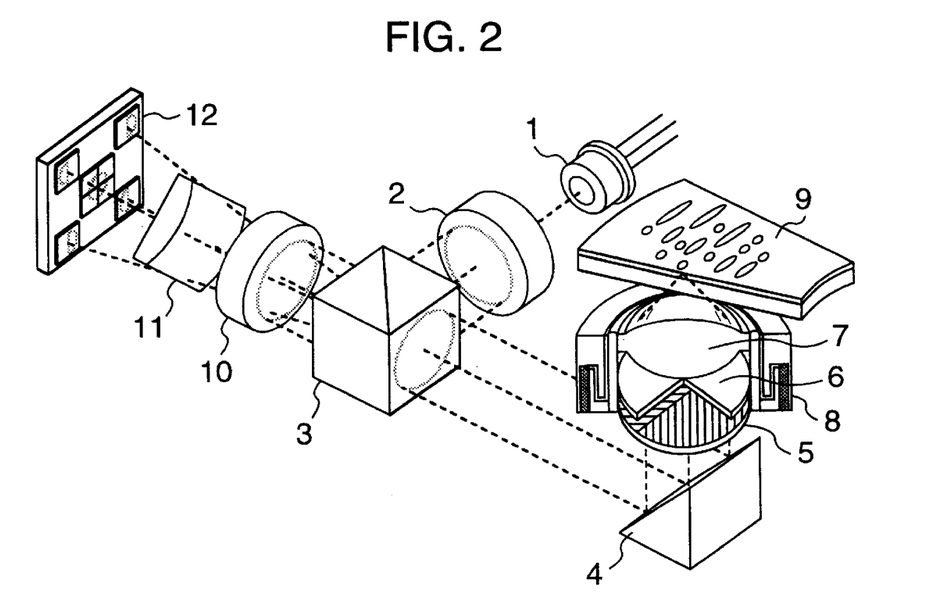
FIG. 2 is a perspective view showing another embodiment according to the present invention.

Referring FIG. 2, there is illustrated a perspective view showing an embodiment similar to the embodiment shown in FIG. 1. In the present embodiment, the positional arrangement of the semiconductor laser 1 side is exchanged with that of the photo detector 12 side with respect to the polarization beam splitter 3. This arrangement corresponds to that the polarization direction of the light beam which has been emitted from the semiconductor laser and then is made incident to the polarization beam splitter 3 in the embodiment shown in FIG. 1 is different from the polarization direction of the light beam which has been emitted from the semiconductor laser and then is made incident to the polarization beam splitter 3 in the present embodiment of FIG. 2 so that the P polarized light is obtained with respect to the separation surface of the polarization beam splitter in FIG. 1, while in FIG. 2, the S polarized light is obtained. Since the present embodiment of FIG. 2 as well as the above-mentioned embodiment of FIG. 1 do not employ the optical system for shaping the light beam, which has been emitted from the semiconductor laser and has the elliptical emission distribution, into the light beam having circular emission distribution, this difference in the polarization direction determines the intensity distribution on the incident pupil of the objective lens 7. Therefore, since the arrangement having the more preferable intensity distribution is selected in terms of the cross-talk and the interference between the codes in correspondence to the disk conditions such as the track pitch and the mark pitch, either the above-mentioned embodiment of FIG. 1 or the present embodiment of FIG. 2 may be selected. In addition, while the optical system for shaping the light beam having the elliptical emission distribution into the light beam having the circular emission distribution is not employed in those embodiments in terms of the manufacturing cost, the present invention can also be essentially applied to the case as well where that optical system is employed.

Figure 3:
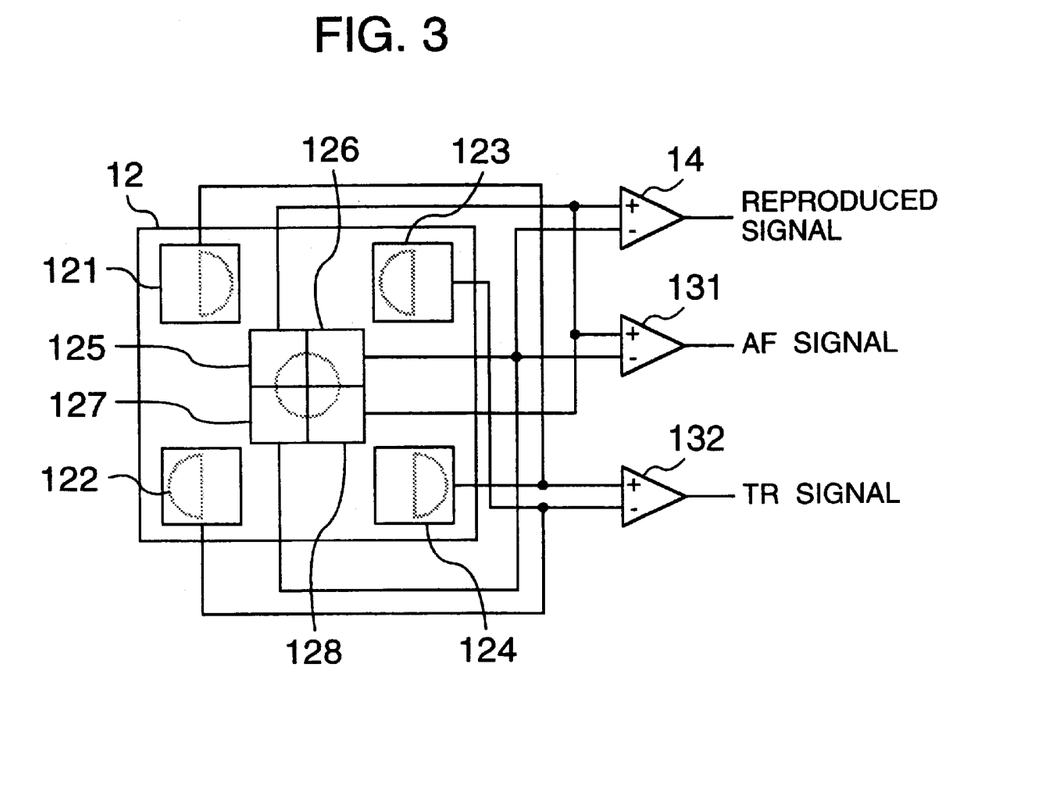
FIG. 3 is a plan view showing both a structure of a detector employed in the basic embodiment according to the present invention and a method of calculating a signal.

Referring now to FIG. 3, there is shown an example of an arrangement for obtaining a focal point deviation error signal, a tracking error signal and a recording information reproducing signal from a signal output of the photo detector 12. The photo detector 12 has four-divided photo detector areas 125, 126, 127 and 128 in which their central portions are adjacent to one another, and four peripheral photo detector areas 121, 122, 123 and 124. The four division photo detector at the central position receives the zero-order light, while the four peripheral photo detectors receive the + first order diffracted light. In this connection, the focal point deviation error signal in the astigmatism method is obtained on the basis of the differential output, which is outputted from a differential amplifier 131, between the sum signal of the outputs of the two detector elements of the four division detector at the central position which are arranged along one diagonal direction and the sum signal of the outputs of the two detector elements thereof which are arranged along the other diagonal direction. In addition, with respect to the peripheral four detectors as well, the differential output, of a differential amplifier 132, between the sum signal of the outputs of the two photo detectors which are arranged along one diagonal direction and the sum signal of the outputs of the two photo detectors which are arranged along the other diagonal direction is obtained, thereby obtaining the tracking error signal by the push-pull method. Then, the data signal is obtained on the basis of the sum signal of the outputs of the four division photo detector at the central position outputted through an addition amplifier 14.

Figures 4A, 4B:
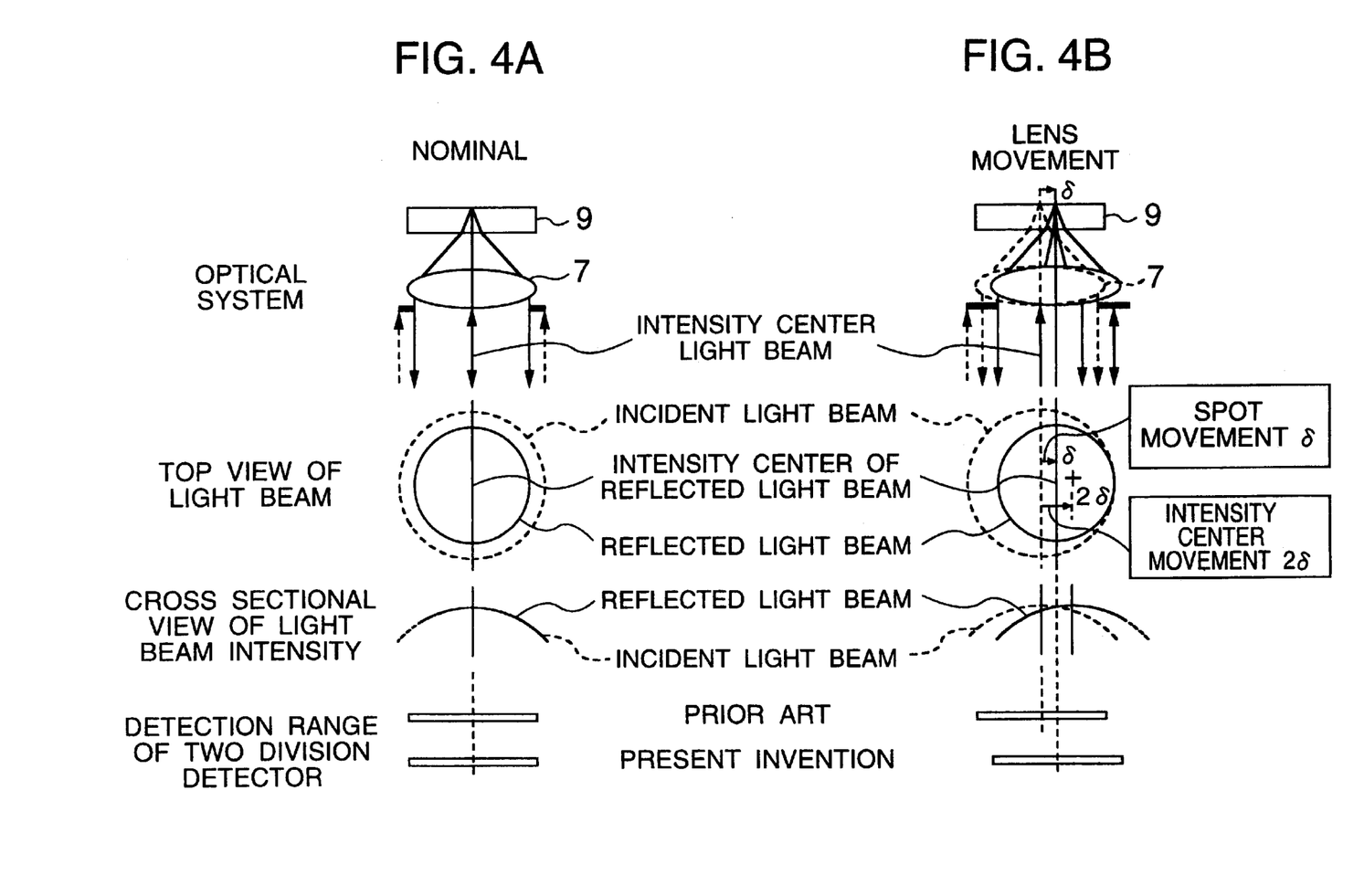
FIGS. 4A and 4B are respectively schematic views each useful in explaining a primary factor of generation of an offset of the tracking signal in the push-pull method.

Referring to FIGS. 4A and 4B, there are respectively illustrated schematic views each useful in explaining that in the detection of the tracking signal by the push-pull method, in the case where the polarizing type diffraction grating is not arranged integrally with the objective lens 7, when the objective lens 7 is moved, the light beam on the two division detector is correspondingly moved. Since the optical disk is an exchangeable medium, the center of the spiral track does not necessarily match with the rotational center of a spindle motor, and hence the optical disk is eccentrically mounted thereto. Then, for the light spot which is being stationary, the track is seen as if it swings. For this reason, in order to make the light spot follow the track, the mechanism for moving the light spot is required. In general, the objective lens is moved by an actuator. FIG. 4A shows a schematic view of the optical system, a top plan view of the light beam, a cross sectional view of the light beam intensity and a detection range of the detector in the case where the center of the objective lens matches the optical axis, while FIG. 4B shows a schematic view of the optical system, a top plan view of the light beam, a cross sectional view of the light beam intensity and a detection range of the detector in the case where the center of the objective lens is moved from the optical axis by δ. From FIGS. 4A and 4B, it can be readily understood that in the case where there is no deviation, the cross section of the intensity distribution is symmetrical with respect to the boundary line of the two division detector, while in the case where there is the deviation, the center of the profile of the reflected light beam is deviated by δ, and a point where the intensity is maximum is deviated by 2δ. As a result, unbalance is generated in the output of the two division photo detector and hence an offset is generated in the tracking signal. On the other hand, in the case where the polarizing type diffraction grating is mounted to the objective lens, since the boundary line of the two division detector is moved together with the objective lens by δ, the deviation with respect to the center of the profile of the reflected light beam is not generated at all. As a result, the offset can be remarkably reduced. However, since there is the deviation of the intensity center, strictly speaking, the offset does not become zero.

Figure 5:
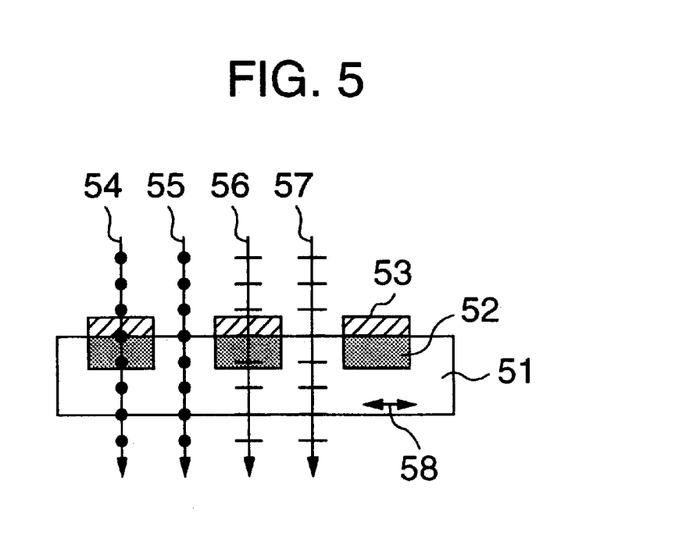
FIG. 5 is a schematic view useful in explaining the operation of a polarizing type diffraction grating.

Referring to FIG. 5, there is illustrated a schematic view useful in explaining one embodiment of the polarizing type diffraction grating. In this case, as one example, there is shown an example employing lithium niobate ($LiNbO_3$). A lithium niobate substrate 51 has the principal axis of refractive index anisotropy in a direction 58 within the drawing, and a proton exchange region 52 is formed in the substrate so as to ALIGN with the grating pattern. In addition, a dielectric film 53 is formed on the proton exchange region 52 so as to align with the grating pattern. In this connection, a phase difference $\phi_O$ between an ordinary ray 54 which is made incident to the grating pattern and an ordinary ray 55 which is made incident to the region between the grating pattern elements, and the phase difference $\phi_e$ between an extraordinary ray 56 which is made incident to the grating pattern and an extraordinary ray 57 which is made incident to the region between the grating pattern elements are expressed as follows, respectively.

$$\phi_o = \frac{2\pi}{\lambda}\{(n_d - 1)T_d + \Delta n_o T_p\} \quad \text{(Expression 1)}$$

$$\phi_e = \frac{2\pi}{\lambda}\{(n_d - 1)T_d + \Delta n_e T_P\}$$

where δ represents the wavelength, $n_d$ represents refractive index of the dielectric film, $T_d$ represents a thickness of the dielectric film, $\Delta n_o$ represents the change in refractive index of the ordinary ray due to the proton exchange (−0.04), $\Delta n_c$ represents the change in refractive index of the extraordinary ray due to the proton exchange (0.12), and $T_p$ represents a depth of the proton exchange region.

Then, if the phase differences are respectively set to the suitable design values by taking the diffraction efficiency into consideration, and also Expression (1) is solved as the simultaneous linear equations with the thickness $T_d$ of the dielectric film and the depth $T_p$ of the proton exchange region as unknown quantities, then it is possible to design the polarizing type diffraction grating in which the desired diffraction efficiency is obtained with both the ordinary ray and the extraordinary ray. The ratio of the ± first order diffracted light to the zero-order diffracted light of the grating having a rectangular grooves, in which the width of the groove is equal to that between the adjacent grooves, with respect to the phase difference φ is in general given by the following expression.

$$\frac{\eta \pm 1}{\lambda} = \frac{4(1 - \cos\phi)}{\pi^2(1 + \cos\phi)} \quad \text{(Expression 2)}$$

where $\eta_o$ represents the diffraction efficiency of the zero-order light, and $\eta\pm 1$ represents the diffraction efficiency of the ± first order light. Therefore, if it is assumed that for example, the diffraction efficiency of the first order light is made equal to that of the zero-order light, φ=115 degrees is obtained. Therefore, if refractive index of dielectric is 2.2 for example and the wavelength is 80nm, then the phase difference $\phi_o$ of the ordinary ray is made zero and also the phase difference $\phi_e$ of the extraordinary ray is made 115 degrees, whereby $T_p$=1.36 μm and $T_d$=0.045 μm are obtained.

Figure 6:
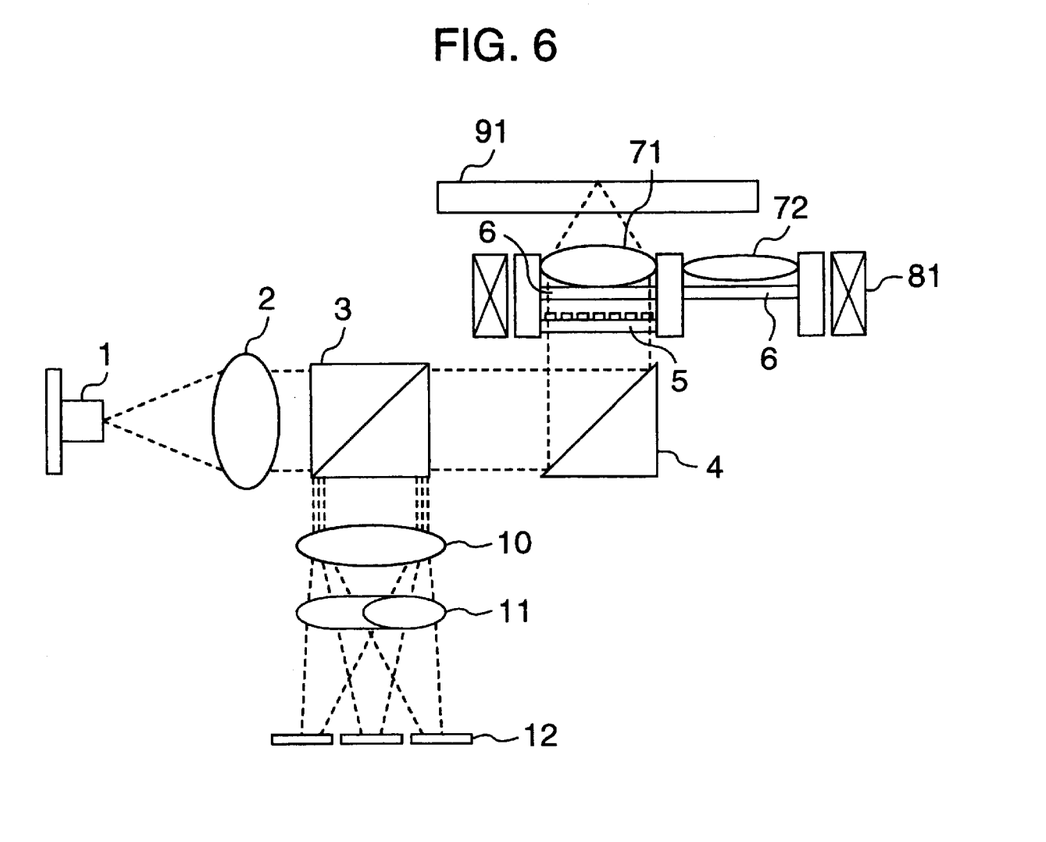
FIG. 6 is a schematic view showing an embodiment of the present invention in optical head for interchanging a CD/DVD substrate thickness and reproducing information therein according to a two-lenses method (in DVD reproduction)

Referring to FIG. 6, there is illustrated an embodiment of an optical head for coping with two kinds of disks having different substrate thicknesses. A point of difference of the present embodiment from the above-mentioned embodiment shown in FIG. 1 is that two objective lenses 71 and 72 are mounted. These two objective lenses 71 and 72 are mounted integrally with each other to a two-dimensional actuator 81 for being able to move a lens and serve to detect the disks having different substrate thicknesses in order to exchange the disk to use the desired disk. As for the two kinds of substrates having different substrate thicknesses, there are a CD with 1.2 mm thickness and an DVD with 0.6mm thickness, and the inter exchange reproduction of an DVD-RAM may be carried out in some cases.

In this connection, the objective lens 71 is provided on the assumption that it corresponds to a disk 91 of the DVD, and the objective lens 72 is provided on the assumption that it corresponds to a disk 92 of the CD. Also, no polarizing type diffraction grating is mounted to the objective lens 72 side. This reason is that since for the DVD-RAM disk, the tracking control needs to carried out utilizing the guiding groove of the landgroove method, the push-pull method is employed, whereas since both the DVD and the CD have only the unevenness pits, similarly to the astigmatism focal point deviation detection method, the phase different detection method can be utilized wherein the differential output between the sum signal of the outputs of the two detector elements of the four division photo detector which are arranged along one diagonal direction and the sum signal of the outputs of the two detector elements thereof which are arranged along the other diagonal direction is made the tracking error signal. The phase difference detection method is such that the signal output is sampled at the edge of the pit, whereby the tracking deviation is detected from the positional deviation of the light spot with respect to the edge. Thus, it is said that in general, the influence of the offset due to eccentricity of the disk is small. Of course, however, in the CD and the DVD as well, the unevenness pits are present intermittently or throughout the periphery of the disk. Therefore, if the low frequency band is of interest, the push-pull signal is detected and hence it is possible to carry out the tracking control.

Figure 7:
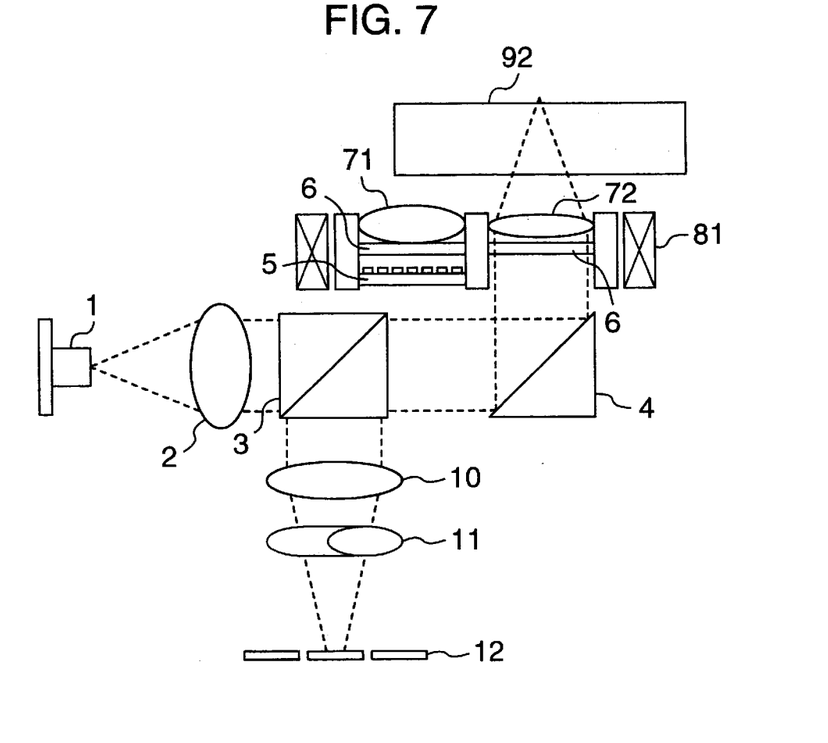
FIG. 7 is a schematic view showing an embodiment of the present invention in a CD/DVD substrate thickness interchanging/information reproducing optical head according to two-lenses method (in CD reproduction)

Referring to FIG. 7, there is illustrated an embodiment in the case where the information in the CD 92 is reproduced with the optical head shown in FIG. 6. Since no polarizing type diffraction grating is provided in this case, no diffracted light is generated, and also the divided areas on the both sides of the detector 12 become unnecessary.

Figure 8:
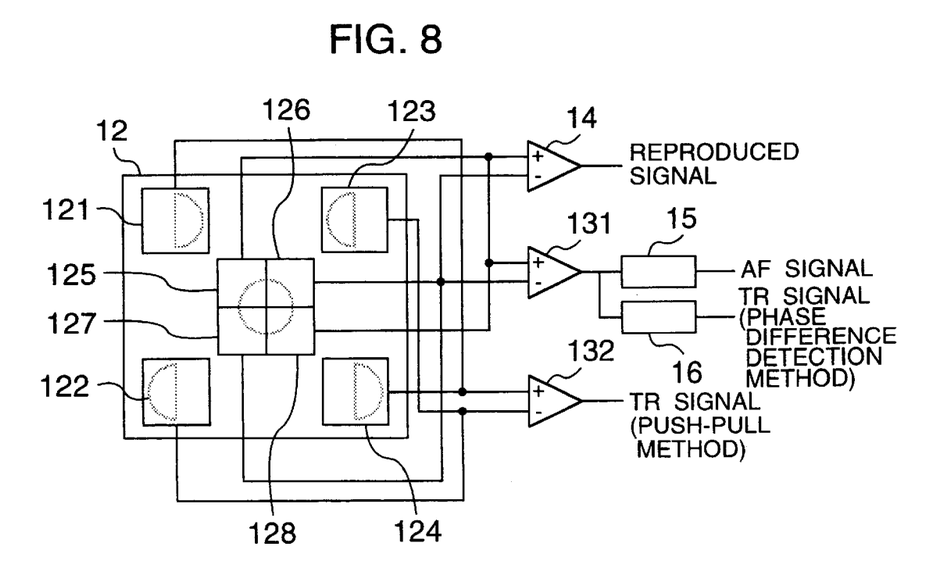
FIG. 8 is a plan view showing a detector arrangement in an embodiment of the present invention in the CD/DVD substrate thickness interchanging/information reproducing optical head according to the two-lenses method and an embodiment of the signal calculating method.

Referring to FIG. 8, there is illustrated an arrangement which is used to detect the push-pull method and the phase difference detection method as the tracking signal in FIGS. 6 and 7. In the phase difference detection method, the same source signal as the focal point deviation detection signal is basically employed. But, since the focal point deviation signal is normally the signal in the lower frequency band than than of the tracking signal, for the purpose of preventing the leakage of the tracking error signal of the phase difference detection method, a low-pass filter 15 is inserted into the circuit. In addition, since only the output at the edge of the pit needs to be sampled when detecting the tracking error signal of the phase difference deviation method, a sampling circuit 16 is also inserted into the circuit.

Figure 9:
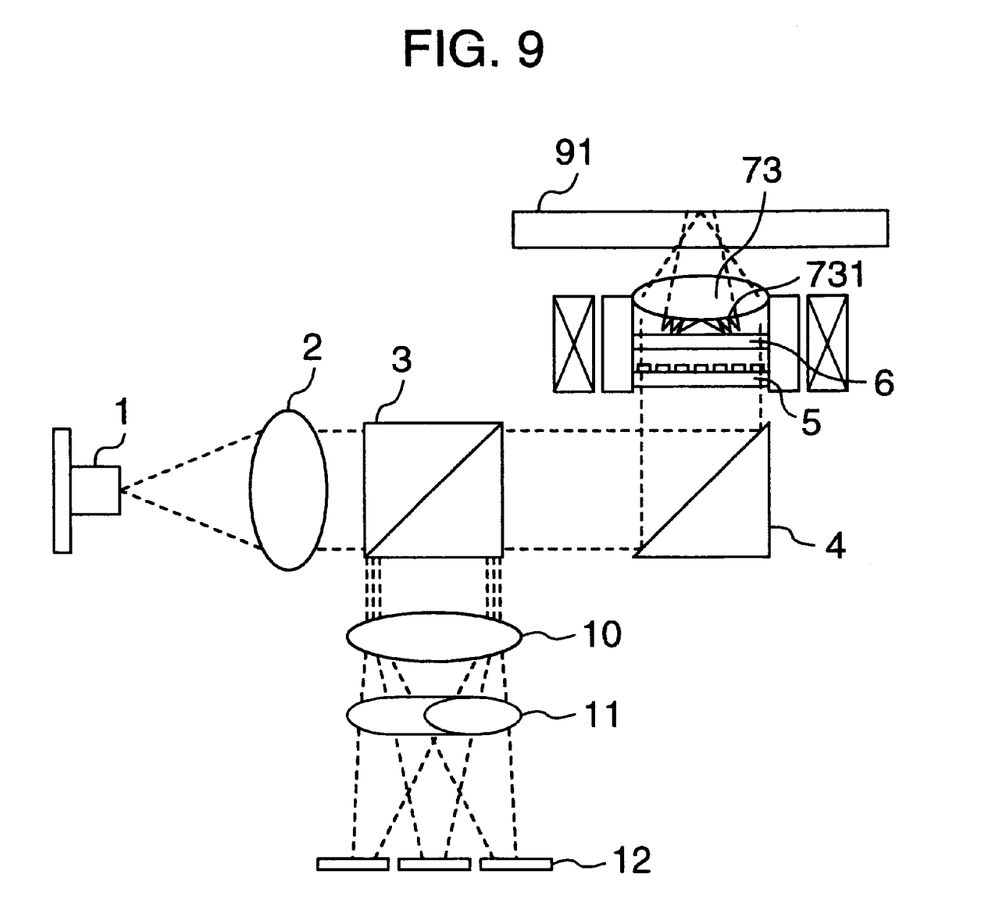
FIG. 9 is a perspective view showing an embodiment of the present invention in the CD/DVD substrate thickness interchanging/information reproducing optical head according to a two-focal points lens employing a grating.

Referring to FIG. 9, there is illustrated an embodiment employing a two-focal points lens 73 in which a hologram 731 is mounted to the objective lens.

Figure 10:
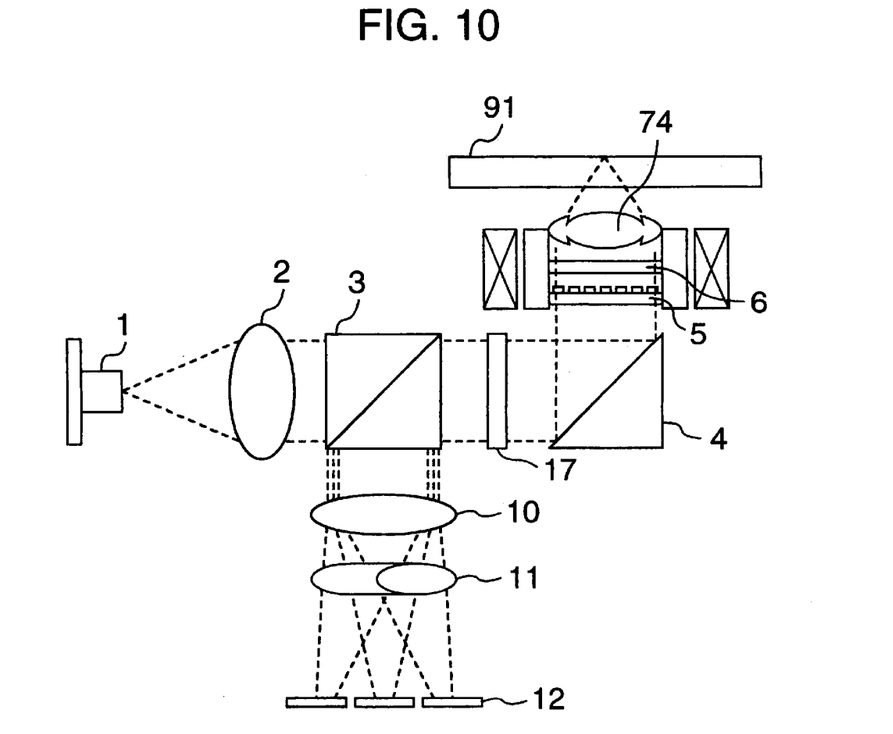
FIG. 10 is a perspective view showing an embodiment of the present invention in a CD/DVD substrate thickness interchanging/information reproducing optical head according to a division lens.

Referring to FIG. 10, there is illustrated an embodiment in the case where a lens 74 with which the most optimal thicknesses of the substrate for condensing the light beam through its central portion and its peripheral portion without aberration are different from each other is employed as the objective lens. It has already been shown by the present inventors that if such a lens is employed, the light source having a smaller wavelength than the light wavelength of 0.78 μm which is normally employed in the reproduction of the information in the CD is employed in the case where the information in the CD is reproduced, and also the NA is optimized, whereby even if the spherical aberration in the reproduction of the information in the CD due to the substrate thickness deviation is large, then the signal quality can be obtained which is substantially equal to that of the conventional CD reproduction signal. In this case, for example, it is assumed that the numerical aperture at the central portion is 0.42, the optimal substrate thickness with which the light of only the central portion is condensed without aberration is 0.8mm, the numerical aperture at the periphery is 0.6, the optimal substrate thickness at the peripheral portion is 0.6mm and the reproduced wavelength is 0.63 μm. In this connection, for the purpose of removing the light at the peripheral portion having the large aberration when reproducing the information in the CD, a variable limitation aperture 17 is inserted into the optical system. The reason of providing the variable limitation aperture 17 is that the aperture needs to be changed so as for the light not to permeate through the whole surface when reproducing the information in the DVD having the large numerical aperture. As for the variable limitation aperture 17, either a simple aperture mounted to means which can be taken out/put from/into the optical system, or an aperture, such as liquid crystal, transmission factor of which is electrically variable may be available. Alternatively, a diaphragm mechanism as employed in a camera may be available.

Figure 11:
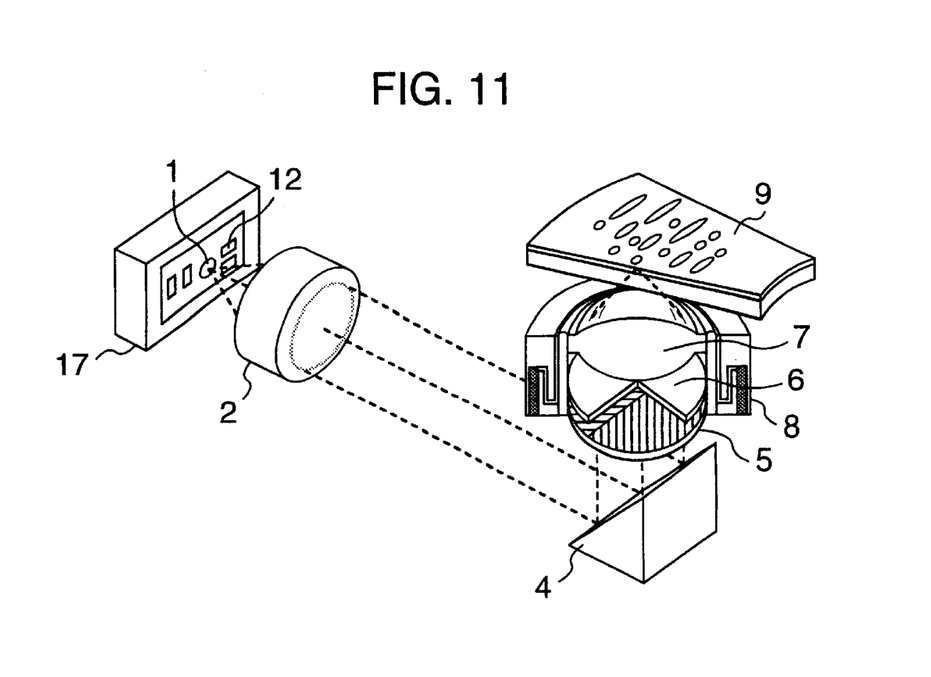
FIG. 11 is a perspective view showing a prior art which does not employ a polarization beam splitter.

Referring to FIG. 11, there is illustrated a perspective view useful in schematically explaining a prior art example. Since the polarization beam splitter is not employed at all, both the semiconductor laser 1 and the division detector 12 are accommodated in one laser/detector integral module 17. In this case, since the zero-order light of the diffracted light is returned back to the semiconductor laser 1, this results in the laser noise being generated. Therefore, it is considered that in order to diffract the light for use in the detection of the focal point deviation and the tracking, the shape of the polarizing type diffraction grating is considerably complicated. But, in this case, since it is only the purpose to carry out the schematic description, the details of the shape of the grating is not shown.

Incidentally, in the above-mentioned description of the preferred embodiments, the same constituent elements are denoted by the same reference numerals, and the description thereof was omitted in some cases for the sake of simplicity.

As set forth hereinabove, according to the present invention, it is possible to provide an optical head in which the means for reducing an offset of a tracking signal, in which the return light noise is less, the detection of the focal point deviation can be readily carried out and which is capable of being applied to optical disks having different substrate thicknesses, can be given, and which is capable of obtaining a high quality reproduced signal inexpensively.

We claim:

1. An optical head comprising:
   a semiconductor laser;
   a light condensing optical system having an objective lens for condensing a laser beam emitted from said semiconductor laser on an optical information recording medium through a transparent substrate in the form of a light spot;
   means for producing a light spot position control signal and means for being able to move the light spot which serve to position the light spot on an information track on said optical information recording medium;
   a polarized light branching element for branching reflected light from said optical information recording medium from said light condensing optical system;
   a polarization conversion element arranged between said optical information recording medium and said polarized light branching element for changing the polarization state of incident light which is made incident to said optical information recording medium and the reflected light therefrom;
   a polarization diffraction grating the diffraction efficiency of which is changed depending on the change in the polarization state of the incident light which is made incident to said optical information recording medium and the reflected light therefrom caused by said polarization conversion element; and
   a photo detector for receiving reflected light through said polarized light branching element in order to subject the reflected light thus received to the photoelectric conversion, said photo detector comprising a central photo detector divided into four areas having their central portions adjacent to each other and four peripheral photo detector areas, wherein said means for being able to move the light spot is mounted to a movable mechanism for moving said objective lens, said polarization conversion element and said polarization diffraction grating together with one another, and the light spot control signal is detected from both diffracted light through said polarization diffraction grating and non-diffracted light out of the light which has been obtained by branching the reflected light through said polarized light branching element.

2. An optical disk apparatus comprising:

a laser light source;

a light condensing optical system for condensing a laser beam emitted from said laser light source on an optical information recording medium in the form of a light spot;

means for producing a light spot position control signal and means for being able to move the light spot which serve to position the light spot in a desired position on said optical information recording medium;

a beam splitter for branching reflected light from said optical information recording medium from said light condensing optical system;

a polarization conversion element arranged between said optical information recording medium and beam splitter;

a diffraction grating arranged between said polarization light branching element and said light condensing optical system; and a photo detector for receiving light which has been obtained by branching the reflected light through said beam splitter, said photo detector comprising a central photo detector divided into four areas having their central portions adjacent to each other and four peripheral photo detector areas, wherein said means for being able to move the light spot is constituted by a movable mechanism for moving said light condensing optical system, said polarization conversion element and said diffraction grating together with one another.

3. An optical disk apparatus comprising:

a laser light source;

a lens for condensing a laser beam emitted from said laser light source on an optical information recording medium in the form of a light spot;

means for producing a light spot position control signal and means for being able to move the light spot which serve the position the light spot in a desired position on said optical information recording medium;

a beam splitter for branching reflected light from said optical information recording medium from said light condensing optical system; and a photo detector for receiving light which has been obtained by branching the reflected light through said beam splitter, said photo detector comprising a central photo detector divided into four areas having their central portions adjacent to each other and four peripheral photo detector areas, wherein a polarization conversion element is arranged between said optical information recording medium and said beam splitter, a diffraction grating is arranged between said polarization conversion element and said lens, the light spot position control signal is produced from both diffracted light through said diffraction grating and non-diffracted light out of the light which has been obtained by branching the reflected light through said beam splitter, and said means for being able to move the light spot comprises a movable mechanism for moving said lens, said polarization conversion element and said diffraction grating together with one another.

4. A tracking apparatus for positioning a light spot in a track on an optical disk, comprising:

a polarization beam splitter for branching reflected light from said optical disk towards a photo detector;

an objective lens for forming the light spot on said optical disk;

a phase plate arranged between said objective lens and said polarization beam splitter;

a polarization diffraction grating arranged between said phase plate and said polarization beam, splitter, the diffraction efficiency thereof being changed depending on the polarization state;

a movable mechanism for moving said objective lens, said phase plate and said diffraction grating together with one another; and a detector comprising a central photo-detector divided into four areas having their central portions adjacent to each other and four peripheral photo-detector areas, receiving light which has been obtained by branching light reflected from the optical disk through said beam splitter.

* * * * *